United States Patent Office 2,941,882
Patented June 21, 1960

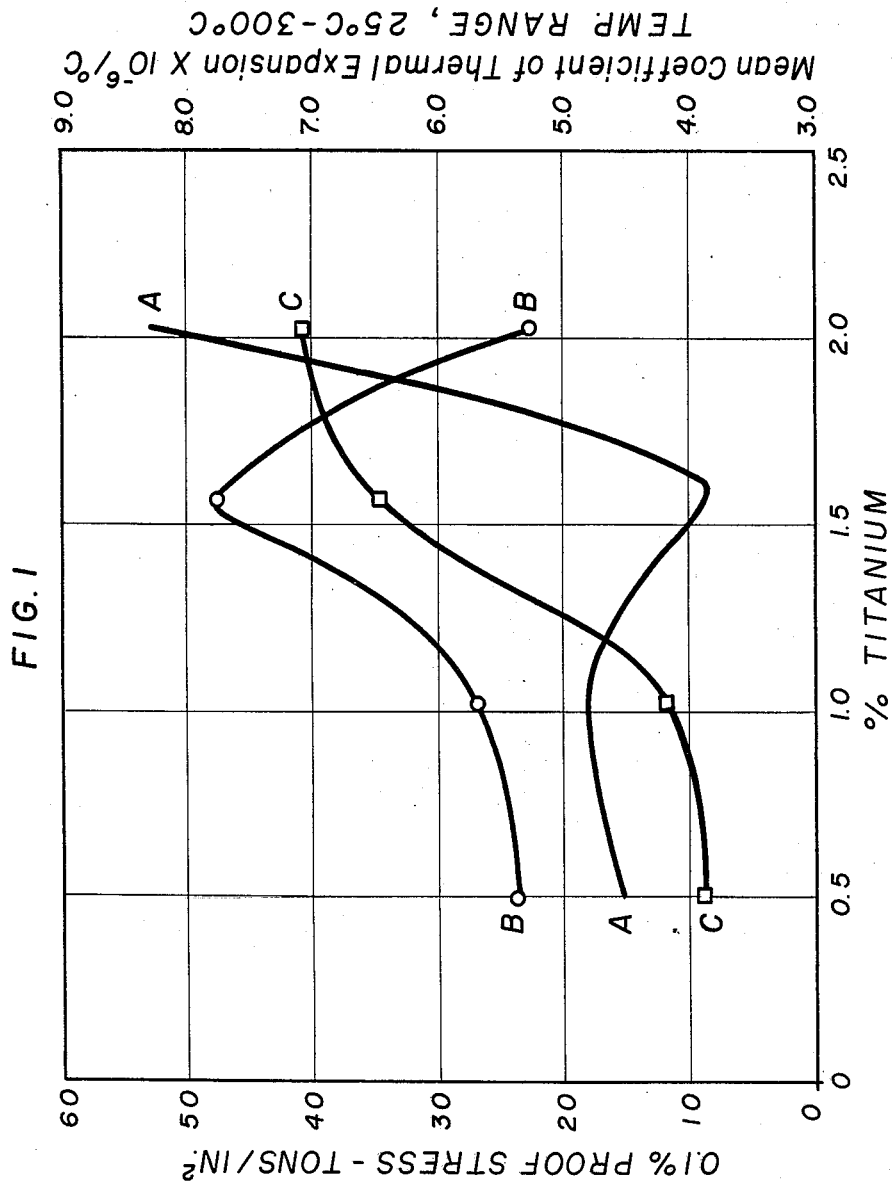

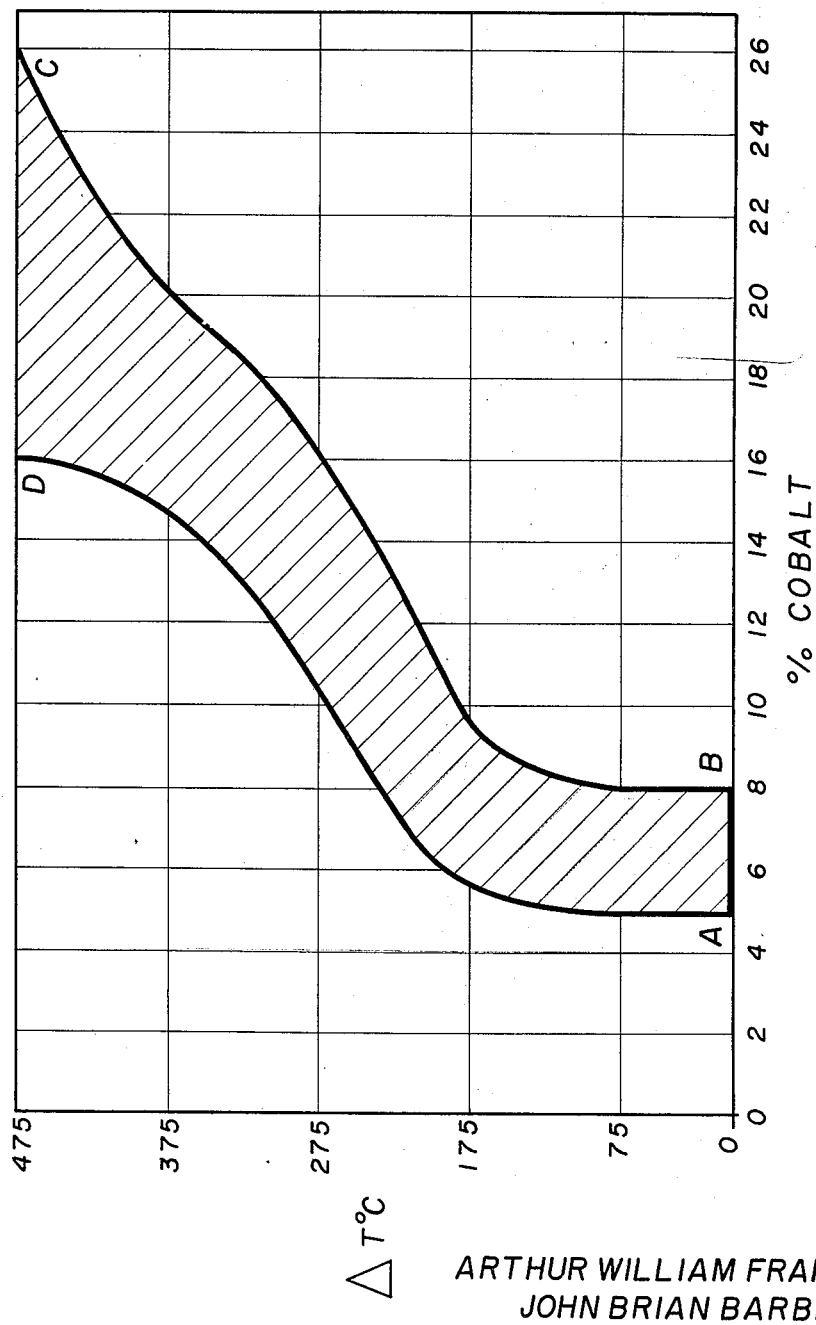

2,941,882
TITANIUM-HARDENED NICKEL-COBALT-IRON ALLOYS

Arthur W. Franklin and John B. Barber, Quinton, Birmingham, England, assignors to The International Nickel Company, Inc., New York, N.Y., a corporation of Delaware Filed Oct. 21, 1958, Ser. No. 768,779

Claims priority, application Great Britain Nov. 1, 1957

10 Claims. (Cl. 75—123)

The present invention relates to iron-nickel-cobalt alloys.

It is well known that the surface temperature of aircraft can rise substantially in high-speed flight through the atmosphere, the temperature reached depending upon both the speed and altitude. Therefore, the alloys from which aircraft components subjected to such kinetic heating are manufactured must be able to withstand the normal stresses of flight at the high temperatures. The alloys should have an 0.1% proof stress of at least 20 tons/sq. in. at all temperatures up to the working temperature.

If there are temperature differences between different regions in a component, further stresses may be set up and to minimize these the alloys from which such components are made should have a low coefficient of thermal expansion, that is to say, a coefficient of thermal expansion lying between values of about 2 and 9 millionths per ° C. at any temperature up to about 500° C.

It is also important, however, that the alloys used should be readily manufactured particularly in the form of sheets of large dimensions and that components can be readily fabricated from the alloy by cold-forming and welding operations and the desired physical and mechanical properties achieved with the minimum of heat-treatment operations. Although attempts were made to provide the foregoing characteristics in an alloy, none, as far as we are aware, was entirely successful when carried into practice commercially on an industrial scale.

It has now been discovered that by the use of a special combination of elements an alloy can be provided which will give satisfactory service when used in fabricated form, for example, in aircraft components subjected in service to specific temperatures up to about 500° C.

It is an object of the present invention to provide an alloy adaptable to be manufactured into aircraft components which will withstand the normal stresses of flight at temperatures up to about 500° C.

Another object of the invention is to provide aircraft components and structures made of an age-hardened alloy which will withstand the normal stresses of flight at temperatures up to about 500° C.

The invention also contemplates providing an age-hardened alloy having a low coefficient of thermal expansion at temperatures up to about 500° C.

Other objects and advantages will become apparent from the following description taken in conjunction with the accompanying drawings in which Figure I is a composite graph showing the variation of mechanical characteristics exhibited by nickel-cobalt-iron alloys containing varying percentages of titanium, and Figure II is a graph showing the variation in cobalt content of the alloys with variation in the operating temperature.

Generally speaking, the present invention contemplates a nickel-iron-cobalt alloy particularly adapted for the manufacture of aircraft structures which retains strength and good mechanical and thermal characteristics at temperatures up to about 500° C. We have now most unexpectedly discovered that the properties required can be obtained in combination in certain nickel-iron-cobalt alloys containing titanium. We find that the titanium content is critical, the mean coefficient of thermal expansion falling to a minimum at about 1.5% titanium and rising steeply as the titanium content rises above 1.5%, while the 0.1% proof stress at 300° C. is high at this titanium content and increases slightly as the titanium content rises above 1.5%.

Alloys according to the invention contain from about 22% to about 36% nickel and from about 5% to about 30% cobalt. Most of the remainder of the alloy is iron. The titanium content is from 1.25% to 1.75%.

In carrying the invention into practice, the ratio of nickel to iron is between 0.5 and 0.65. The properties of the alloy depend largely upon the titanium content that is maintained in solid solution in the alloy but some carbon will inevitably be present and this will, by combination with part of the titanium, reduce the amount in solid solution in the alloy. We normally restrict the maximum carbon content of the alloys to 0.05%, therefore, and prefer that the carbon content be less than 0.03%. If the carbon content is higher, for example, up to about 0.05%, then an additional amount of titanium equal to four times the carbon content in excess of 0.03% must be further added in addition to that which would otherwise be required.

The alloys may also contain copper up to 2%. Manganese, however, tends to increase the thermal expansion and should be kept as low as possible, for example, not greater than about 0.5%. Silicon, molybdenum and niobium are all undesirable and none of them should be present in an amount greater than 1%.

The attainment of high strength in the alloys according to the invention depends upon age-hardening. In order to attain high strength in age-hardening alloys, it is usual to heat them first to a relatively high temperature, the so-called solution temperature, in order to dissolve the age-hardening constituents and then to effect hardening by re-heating at a lower temperature. Large components fabricated from sheet cannot be solution-heated without serious distortion. An important advantage possessed by the alloys according to the invention is that they can be made to acquire useful properties without preliminary solution-treatment. If a sheet of an alloy according to the invention is produced by hot-rolling processes, then only a hardening treatment for from 5 to 30 hours in the temperature range of 550° C. to 650° C. is needed. The actual times and temperatures used depend upon the exact properties desired from a particular alloy.

Even improved properties can be obtained if the hot-rolled sheet is cold-rolled before aging. This fact is important because it is frequently preferable to fabricate a relatively thin sheet by a cold-rolling process and many components are fabricated, in any case, by cold-working processes.

When components are to be made from cold-worked material of many alloys it is usual to soften the alloy by annealing before fabrication of components. When the components are, or include sheets of large dimension, it is advantageous to dispense with such annealing processes. We find that the alloys can be cold-rolled to a substantial amount, but still remain soft enough to allow further cold-working operations.

It is important that the alloys should have reasonable resistance to creep at the temperature of operation and we have discovered that in this respect the alloys have useful properties.

The alloy can be welded by gas and metallic arc techniques.

The strength and expansion characteristics of nickel-cobalt-iron alloys containing from about 0.5% to about 2.0% titanium and 29% nickel, 17% cobalt, with the balance iron, are illustrated in the drawing, Figure 1. Curve "A—A" shows the variation of mean coefficient of thermal expansion (over the temperature range 25–300° C.) as the percentage of titanium is varied. Curve "B—B" illustrates the variation of 0.1% proof stress at room temperature as the percentage of titanium is varied and curve "C—C" shows the variation of 0.1% proof stress at 300° C. with respect to percentage of titanium. It is to be observed that each of the foregoing characteristics approach the optimum value when the titanium content of the alloy is about 1.5%.

It is known to add cobalt to iron-nickel alloys of low thermal expansion. In the alloys according to the invention, however, the cobalt content plays an important and unexpected part, since the cobalt content at which the minimum mean coefficient of thermal expansion occurs increases with the temperature range over which the mean is taken. This is shown by the curve in the drawing, Figure 2. These curves are plotted against an abscissa representing the percentage of cobalt in the alloy and an ordinate representing an increment of temperature $\Delta T$ where $\Delta T$ is the elevation of the operating temperature above room temperature when room temperature is 25° C. It will be seen that if an article made from an alloy according to the invention is to be heated in service to temperatures from 25° C. to 100° C. and the mean coefficient of thermal expansion is to be as low as possible, the cobalt content should be from 5–8%. If the article is to be heated in service from temperatures of 25° C. up to 200° C., 300° C., 400° C., and 500° C., the corresponding cobalt content will as previously lie within the area A, B, C, D, A shown on the curve of Figure 2, and the corresponding cobalt contents should be from about 6–9%, 11–16%, 15–20% and 16–26% respectively. The coefficients of thermal expansions for these alloys are set out below:

| Co in percent | Temperature Range, ° C. | Minimum coefficient Thermal mean Expansion |
| --- | --- | --- |
| 5–8 | 25–100 | $1.4 \times 10^{-6}/°C.$ |
| 6–9 | 25–200 | $2.3 \times 10^{-6}/°C.$ |
| 11–16 | 25–300 | $3.7 \times 10^{-6}/°C.$ |
| 15–20 | 25–400 | $5.2 \times 10^{-6}/°C.$ |
| 16–26 | 25–500 | $6.8 \times 10^{-6}/°C.$ |

For the purpose of giving those skilled in the art a better understanding of the invention and/or a better appreciation of the advantages of the invention, the following illustrative examples are given:

*Example I*

An iron-base alloy containing 0.02% carbon, 0.61% silicon, 0.28% manganese, 1.43% titanium, 27.6% nickel and 25.6% cobalt, in the form of hot-rolled plate ¼" thick, which was heated for ¼ hour at 800° C., air-cooled, heated for 24 hours at 600° C. and again air-cooled, was found to have the following properties at room temperature:

| 0.1% Proof Stress (tons/sq. in.) | Ultimate Tensile Stress (tons/sq. in.) |
| --- | --- |
| 51.5 | 65.5 |

The properties were also good at temperatures of 300° C. and 500° C.

| | 0.1% Proof Stress (tons/sq. in.) | Ultimate Tensile Stress (tons/sq. in.) |
| --- | --- | --- |
| 300° C. | 41.7 | 57.8 |
| 500° C. | 38.2 | 52.5 |

The mean coefficients of thermal expansion of this alloy were found to be

| ° C. | Coefficient of Thermal Expansion per ° C. |
| --- | --- |
| 25–200 | $8.01 \times 10^{-6}$ in./in. |
| 25–300 | $7.67 \times 10^{-6}$ in./in. |
| 25–400 | $7.29 \times 10^{-6}$ in./in. |
| 25–500 | $7.49 \times 10^{-6}$ in./in. |

*Example II*

An alloy having the same composition as the alloy set forth in Example I was found to have the following properties when hot rolled ¼" thick and then aged for 24 hours at 600° C.

| | 0.1% Proof Stress (tons/sq. in.) | Ultimate Tensile Stress (tons/sq. in.) |
| --- | --- | --- |
| Room temperature | 59.1 | 69.9 |
| 300° C. | 48.6 | 60.4 |
| 500° C. | 45.1 | 56.0 |

*Example III*

As an illustration of the effect of cold-working, the hardness of the alloy set forth in Example I after annealing for 20 minutes at 950° C. was 177 B.H.N. and increased only to a value of 235 B.H.N. when further cold-rolled to effect 15% reduction in thickness. The hardness increased to 245 B.H.N. with a reduction in the thickness of 35% and to 255 B.H.N. with a reduction of 52% in the thickness. The cold-rolled sheet, 16 S.W.G. (0.064 inch) thick produced by approximately 50% final reduction of thickness, was shown, by the Erichson deep-drawing test, to be capable of substantial further cold-working. Thus an Erichson value of 10.65 was obtained, whereas the same alloy after annealing for 15 minutes at 800° C. and having a hardness of 201, gave only a slightly increased value in the same test of 11.2.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. An age-hardenable alloy of low thermal expansion having a 0.1% proof stress in excess of about 20 tons per square inch in the age-hardened condition at temperatures up to about 500° C. containing about 22% to about 36% nickel, about 5% to about 30% cobalt, about 1.25% to about 1.75% of titanium and the balance being essentially iron.

2. An age-hardenable alloy of low thermal expansion having a 0.1% proof stress in excess of about 20 tons per square inch in the age-hardened condition at temperatures up to about 500° C. containing about 22% to about 36% nickel, about 5% to about 30% cobalt, up to about 0.05% carbon, up to about 2% copper, up to about 1% each of silicon, molybdenum and niobium, an amount of titanium equal to about 1.25% to about 1.75% plus four times the percent of carbon in excess of 0.03% and the balance being essentially iron.

3. An age-hardened alloy of low thermal expansion having a 0.1% proof stress in excess of about 20 tons per square inch at temperatures up to about 500° C. containing about 22% to about 36% nickel, about 5% to about 30% cobalt, up to about 0.05% carbon, up to about 2% copper, up to about 1% each of silicon, molybdenum and niobium, and up to 0.5% manganese, an amount of titanium equal to about 1.25% to about 1.75% plus four times the percent of carbon in excess of 0.03%, and the balance being essentially iron.

4. A low thermal expansion, high strength alloy for metallic structures subjected in use to the detrimental effects of temperature and stresses induced by thermal gradients within the temperature range of about 25° C. to about 500° C. which contains about 22% to about 36% nickel, about 1.25% to about 1.75% titanium with the balance being essentially iron and cobalt, the cobalt content of said alloy being such that, when plotted against the increment of temperature herein before defined it falls within the area ABCDA as set forth in Figure 2 of the accompanying drawing.

5. A method for producing a low thermal expansion, high strength metallic structure subjected in use to the detrimental effects of temperature and stresses induced by thermal gradients within the temperature range of about 25° C. to about 500° C. which comprises establishing a molten bath of alloy containing about 22% to about 36% nickel, about 1.25% to about 1.75% titanium with the balance being essentially iron and cobalt, adjusting the cobalt content of said molten alloy so that when the cobalt content of the alloy is plotted against the increment of temperature herein before defined, it falls within the area ABCDA as set forth in Figure 2 of the accompanying drawing and thereafter casting said alloy and forming structures therefrom.

6. A low thermal expansion, high strength alloy for metallic structures subjected in use to the detrimental effects of thermal changes and gradients within the temperature range of about 25° C. to about 100° C. which contains about 28% to about 36% nickel, about 1.25% to about 1.75% titanium, about 5% to about 8% cobalt with the balance being essentially iron.

7. A low thermal expansion, high strength alloy for metallic structures subjected in use to the detrimental effects of thermal changes and gradients within the temperature range of about 25° C. to about 200° C. which contains about 29% to about 36% nickel, about 1.25% to about 1.75% titanium, about 6% to about 9% cobalt with the balance being essentially iron.

8. A low thermal expansion, high strength alloy for metallic structures subjected in use to the detrimental effects of thermal changes and gradients within the temperature range of about 25° C. to about 300° C. which contains about 27% to about 34% nickel, about 1.25% to about 1.75% titanium, about 11% to about 16% cobalt with the balance being essentially iron.

9. A low thermal expansion, high strength alloy for metallic structures subjected in use to the detrimental effects of thermal changes and gradients within the temperature range of about 25° C. to about 400° C. which contains about 26% to about 32% nickel, about 1.25% to about 1.75% titanium, about 15% to about 20% cobalt with the balance being essentially iron.

10. A low thermal expansion, high strength alloy for metallic structures subjected in use to the detrimental effects of thermal changes and gradients within the temperature range of about 25° C. to about 500° C. which contains about 24% to about 32% nickel, about 1.25% to about 1.75% titanium, about 16% to about 26% cobalt with the balance being essentially iron.

References Cited in the file of this patent

UNITED STATES PATENTS

| | | |
|---|---|---|
| 2,266,481 | Talbot | Dec. 16, 1941 |

FOREIGN PATENTS

| | | |
|---|---|---|
| 486,768 | Canada | Sept. 23, 1952 |